(12) United States Patent
Wilson et al.

(10) Patent No.: US 10,341,452 B2
(45) Date of Patent: Jul. 2, 2019

(54) METHOD, APPARATUS AND NETWORK FOR MULTI-DOMAIN CONFERENCE MANAGEMENT

(71) Applicant: Tata Communications (America) Inc., Herndon, VA (US)

(72) Inventors: Lee Joseph Wilson, Freehold, NJ (US); Joseph W. Nocchi, Manasquan, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 970 days.

(21) Appl. No.: 14/841,693

(22) Filed: Aug. 31, 2015

(65) Prior Publication Data

US 2016/0088111 A1 Mar. 24, 2016

Related U.S. Application Data

(60) Provisional application No. 62/052,237, filed on Sep. 18, 2014.

(51) Int. Cl.
*H04L 29/08* (2006.01)
*H04L 12/18* (2006.01)
(Continued)

(52) U.S. Cl.
CPC ...... *H04L 67/2833* (2013.01); *H04L 12/1822* (2013.01); *H04L 12/1827* (2013.01);
(Continued)

(58) Field of Classification Search
CPC . H04L 12/1822; H04L 12/1827; H04L 51/36; H04L 67/1087; H04L 67/2833; G06F 15/16
(Continued)

(56) References Cited

U.S. PATENT DOCUMENTS 6,282,278 B1 8/2001 Doganata et al.
6,446,144 B1 * 9/2002 Habusha ............... H04L 47/10
379/229

(Continued)

FOREIGN PATENT DOCUMENTS

EP 2518985 A1 10/2012

OTHER PUBLICATIONS

Authorized Officer: Yeo, Eng Guan (DR), "Written Opinion" issued in counterpart Singapore Patent Application No. 10201507706U, dated Dec. 17, 2016, Published in: SG.

(Continued)

*Primary Examiner* — Tesfay Yohannes
(74) *Attorney, Agent, or Firm* — Kaplan Breyer Schwarz, LLP

(57) ABSTRACT

A conference management system, network, and method for enabling the management of teleconference resources across multiple telecommunications networks that serve multiple conference domains. A disclosed multi-domain conference manager (MDCM) subscribes to a network management platform and for one or more sets of entities. Each set defines a particular combination of i) communications service provider(s) (CSP) and ii) enterprise, in which the combination defines a particular scope of management. When a conference-related event occurs, such as a particular conference involving video endpoints being set up with a unified communications (UC) network, the MDCM can notify a CSP network that is within a same scope of management as the UC network, to report on related events as they occur. The MDCM can then coordinate the connection of resources associated with the multiple domains via a cascaded link between bridging resources that serve the different domains.

18 Claims, 11 Drawing Sheets

(51) Int. Cl.
*H04L 12/58* (2006.01)
*H04L 29/06* (2006.01)

(52) U.S. Cl.
CPC ............ *H04L 51/36* (2013.01); *H04L 65/403* (2013.01); *H04L 67/1087* (2013.01)

(58) Field of Classification Search
USPC .................................................. 709/204, 221
See application file for complete search history.

(56) References Cited

U.S. PATENT DOCUMENTS

| | | | |
|---|---|---|---|
| 7,064,681 B2* | 6/2006 | Horstemeyer | B60R 25/102 340/994 |
| 8,458,253 B1 | 6/2013 | Sojka et al. | |
| 8,670,748 B2* | 3/2014 | Slack | G06F 9/4843 455/411 |
| 9,154,532 B2* | 10/2015 | Fernandez Gutierrez | G06Q 30/02 |
| 2004/0004942 A1 | 1/2004 | Nebiker et al. | |
| 2005/0094579 A1 | 5/2005 | Acharya et al. | |
| 2007/0214217 A1* | 9/2007 | Ueno | H04L 51/04 709/204 |
| 2007/0285503 A1 | 12/2007 | Asthana et al. | |
| 2011/0137993 A1 | 6/2011 | Yi et al. | |
| 2011/0271192 A1 | 11/2011 | Jones et al. | |
| 2011/0271332 A1* | 11/2011 | Jones | H04L 9/3247 726/7 |
| 2012/0062734 A1* | 3/2012 | Mironichev | H04N 7/185 348/143 |
| 2012/0278735 A1 | 11/2012 | Singh | |
| 2012/0293605 A1* | 11/2012 | Seferian | H04N 7/147 348/14.08 |
| 2013/0073473 A1* | 3/2013 | Heath | G06Q 30/02 705/319 |
| 2013/0110565 A1* | 5/2013 | Means, Jr. | G06Q 10/06 705/7.11 |
| 2014/0344720 A1* | 11/2014 | Kumashio | H04N 7/15 715/753 |
| 2015/0003595 A1* | 1/2015 | Yaghi | G06Q 10/063 379/85 |

OTHER PUBLICATIONS

Authorized Officer: Yeo, Eng Guan (DR), "Examination Report" issued in counterpart Singapore patent Application No. 10201507706U, dated Oct. 23, 2017, Published in: SG.
John Tan, "Notice of Eligibility for Grant"issued in co-pending Singapore patent application No. 10201507706U, dated Nov. 7, 2017, Published in: SG.
"Search Report", dated Mar. 2, 2016, issued in counterpart Singapore Patent Application No. 10201507706U.
"European Search Report" dated Jan. 27, 2016, issued in counterpart European Patent Application No. 15002699.5.

* cited by examiner

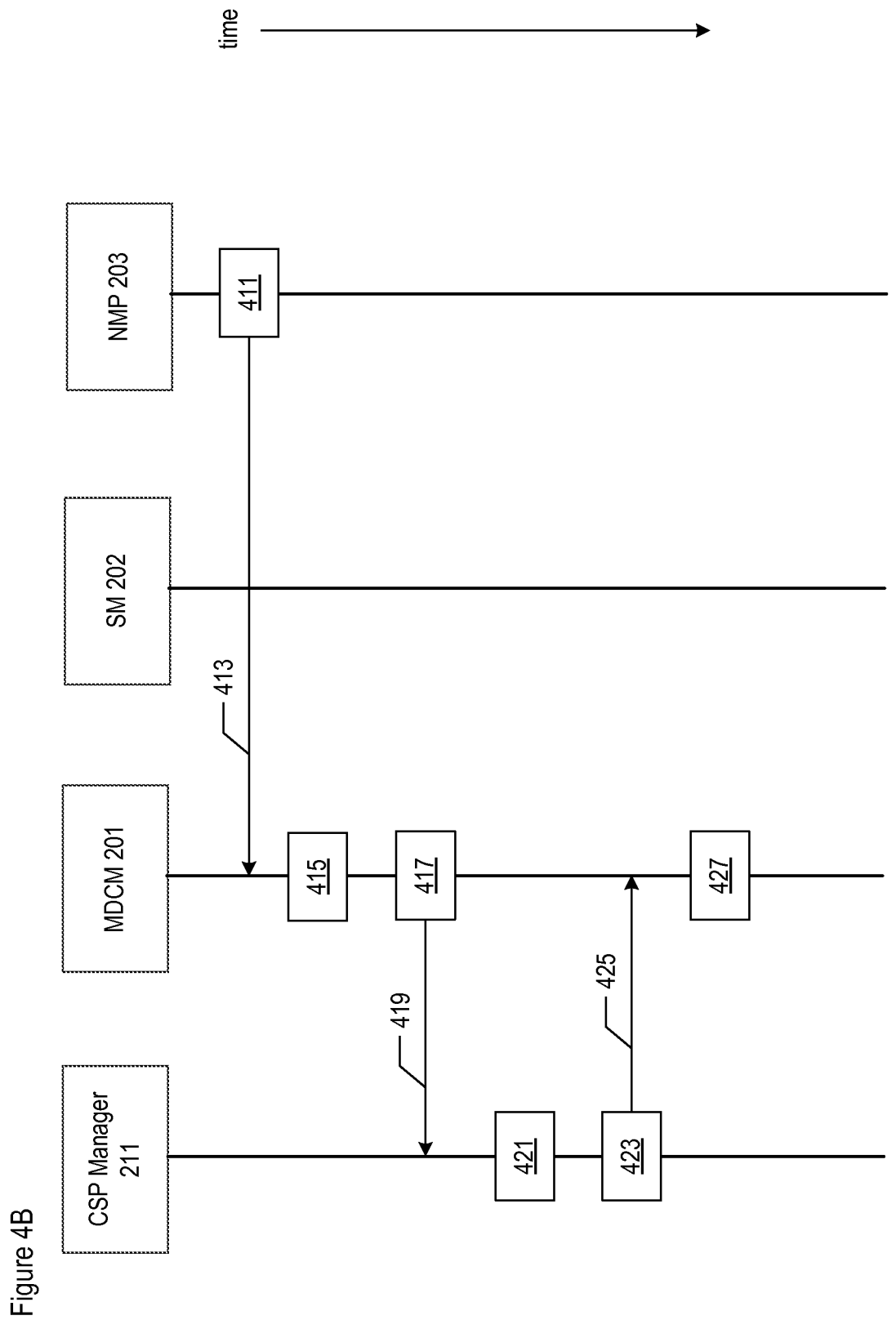

METHOD, APPARATUS AND NETWORK FOR MULTI-DOMAIN CONFERENCE MANAGEMENT

CROSS REFERENCE TO RELATED APPLICATIONS

The following U.S. provisional application is incorporated herein by reference: U.S. Patent Application Ser. No. 62/052,237, filed Sep. 18, 2014. If there are any contradictions or inconsistencies in language between this application and the provisional application that has been incorporated by reference that might affect the interpretation of the claims in this application, the claims in this application should be interpreted to be consistent with the language in this application.

FIELD OF THE INVENTION

The present invention relates to telecommunications in general, and, more particularly, to enabling, optimizing and managing communication sessions across multiple teleconferencing environments.

BACKGROUND OF THE INVENTION

Cloud-based Unified Communication (UC) services can provide unique conferencing and collaboration services to customers such as business enterprises, as well as the distinguishing ability to offer certain communications service providers (CSP) the ability to market, resell, and manage UC services on a set of common infrastructure.

A business enterprise, such as a large corporation, might have multiple telecom service contracts in effect with a UC provider, such as Tata Communications, and also with one or more CSPs for voice services, such as AT&T or Time Warner. Where this is the case, the business enterprise will want its employees to utilize all such telecom resources to the greatest extent possible. In the course of doing business, an employee might use both UC provider resources and CSP provider resources regularly, and teams of employees might use both sets of resources concurrently within each team, such as for conferencing.

Meanwhile, a CSP might want to leverage its own embedded communications infrastructure in adopting, utilizing, and reselling UC services. An implementation in which a CSP leverages its infrastructure atop the common UC infrastructure can be broadly referenced as a Converged Communication Architecture (CCA). In order to provide CCA abilities where end-users can access service from either CSP- or UC-based facilities, a set of robust conference notification and management interfaces are required.

Ideally, conferencing in this manner should be able to take place across multiple locations such as within a company, at home, or somewhere while traveling on a business or personal trip. However, because each computer network that serves each teleconferencing environment, or "domain," has a particular demarcation and each demarcation limits the network's connectivity with one or more other computer networks of other teleconferencing environments, the networking of endpoints across multiple domains can be problematic.

Accordingly, what is needed is an improved technique for executing and managing inter-domain communication sessions, without at least some of the disadvantages in the prior art.

SUMMARY OF THE DISCLOSURE

A conference management system, telecommunications network, and method are disclosed for enabling the management of teleconference resources across multiple telecommunications networks. A particular problem in at least some systems in the prior art can occur where multiple telecommunications networks are managed by different service providers. For example and without limitation, a unified communications (UC) network with video conferencing resources might be managed by a first service provider, a voice communications network with audio bridging resources might be managed by a second service provider, and a business enterprise might have user agreements in place with both the first and second service providers.

In such a scenario, the business enterprise, as a user of both the UC network and the voice communications network, needs to be able to leverage both networks, each serving one or more teleconference domains, in order to take advantage of the telecommunications resources in both networks to which it has access. The multi-domain conference manager (MDCM) of the present disclosure is intended to address the foregoing need of a business enterprise—or of another type of entity, such as a communications service provider—to leverage multiple telecommunications networks that are managed by different service providers.

In accordance with the illustrative embodiment of the present disclosure, the MDCM, which can operate within one of the managed telecommunications networks mentioned above, subscribes to a network management platform (NMP) and for one or more sets of entities. Each set of entities defines a particular combination of i) communications service provider(s) (CSP) and ii) enterprise, in which the combination defines a particular scope of management. Additionally, the MDCM can subscribe to conference-related events affecting a set of entities, so that the MDCM can receive notifications from the NMP when the subscribed-to events occur.

When a conference-related event occurs, such as a particular conference involving some video endpoints that are being set up with the UC network, the MDCM can notify one or more managed CSP networks that are within a same scope of deployment as that of the UC network, to report on related events as they occur. A related event in the CSP network might be, for example, an audio bridge being accessed within the CSP network to access the particular conference. Then, by directing a session manager that is assigned to handle the particular conference, the MDCM can coordinate the connection of resources associated with the multiple domains via a cascaded link between bridging resources serving different domains. Such inter-domain resources include i) a multipoint control unit (MCU) that is accommodating one or more video endpoints that are accessing the conference directly through the enterprise network and ii) an audio bridge within the CSP network that is accommodating one or more audio endpoints that are accessing through the CSP network, for example and without limitation. The MDCM can also coordinate the deallocation of resources at the end of each conference, such as the dropping of a cascaded link between bridging resources that are serving different domains.

The multi-domain conference manager disclosed herein operates within a telecommunications network that provides cloud-based, unified communications (UC) video services, in accordance with the illustrative embodiment of the present disclosure. As those who are skilled in the art will appreciate after reading this specification, however, the disclosed conference manager can operate within a different type of telecommunications network providing a different type of service. Furthermore, as those who are skilled in the art will appreciate after reading this specification, the other telecommunications networks that are involved in a conference can provide services other than the audio services described herein.

An illustrative method comprises: transmitting, by a conference management system in a first telecommunications network to a second data-processing system, a first message that specifies a subscription to events that involve a predetermined set of entities; receiving, by the conference management system, a second message from the second data-processing system specifying that a first conference is starting, wherein the first conference involves the set of entities identified in the first message; receiving the second message, transmitting by the conference management system a third message to a third data-processing system in a second telecommunications network, wherein the third message specifies to the third data-processing system to monitor for activities related to the first conference, and wherein the first and second telecommunications networks are managed by different service providers; and upon receiving a fourth message from the third data-processing system wherein the fourth message specifies the first conference, establishing by the conference management system a communications link between a first bridging device in the first telecommunications network and a second bridging device in the second telecommunications network, wherein the first and second bridging devices are being used by the first conference, and wherein the receiving of the fourth message is subsequent to the transmitting of the third message.

An illustrative conference management system in a first telecommunications network comprises: a receiver that is configured to receive a second message from a second data-processing system specifying that a first conference is starting, wherein the first conference involves a predetermined set of entities identified in a first message transmitted to the second data-processing system; a transmitter that is configured to transmit: (i) the first message to the second data-processing system, wherein the first message specifies a subscription to events that involve the predetermined set of entities, (ii) upon receiving the second message, a third message to a third data-processing system in a second telecommunications network, wherein the third message specifies to the third data-processing system to monitor for activities related to the first conference, and wherein the first and second telecommunications networks are managed by different service providers; and a processor that is configured to coordinate, based on a fourth message being received from the third data-processing system subsequent to the transmitting of the third message and that specifies the first conference, the establishing of a communications link between a first bridging device in the first telecommunications network and a second bridging device in the second telecommunications network, wherein the first and second bridging devices are being used by the first conference.

An illustrative first telecommunications network comprises: a conference management system that is configured to: (i) transmit, to a second data-processing system, a first message that specifies a subscription to events that involve a predetermined set of entities, (ii) receive a second message from the second data-processing system specifying that a first conference is starting, wherein the first conference involves the set of entities identified in the first message, (iii) transmit, upon receiving the second message, a third message to a third data-processing system in a second telecommunications network, wherein the third message specifies to the third data-processing system to monitor for activities related to the first conference, and wherein the first and second telecommunications networks are managed by different service providers, and (iv) establish, upon receiving a fourth message from the third data-processing system wherein the fourth message specifies the first conference, a communications link between a first bridging device in the first telecommunications network and a second bridging device in the second telecommunications network, wherein the first and second bridging devices are being used by the first conference, and wherein the receiving of the fourth message is subsequent to the transmitting of the third message; and a network management platform that is configured to: (i) receive the first message from the conference management system, (ii) receive, from the first bridging device, an indication that a communication session with a first endpoint has started, and (iii) transmit the second message to the conference management system, in response to the receiving of (a) the first message and (b) the indication that the communication session has started.

BRIEF DESCRIPTION OF THE DRAWINGS

FIGS. 4A through 4D depict message flow diagrams that represent at least some of the salient, operational logic of MDCM 201 and other elements in system 100.

DETAILED DESCRIPTION

Figure 1:
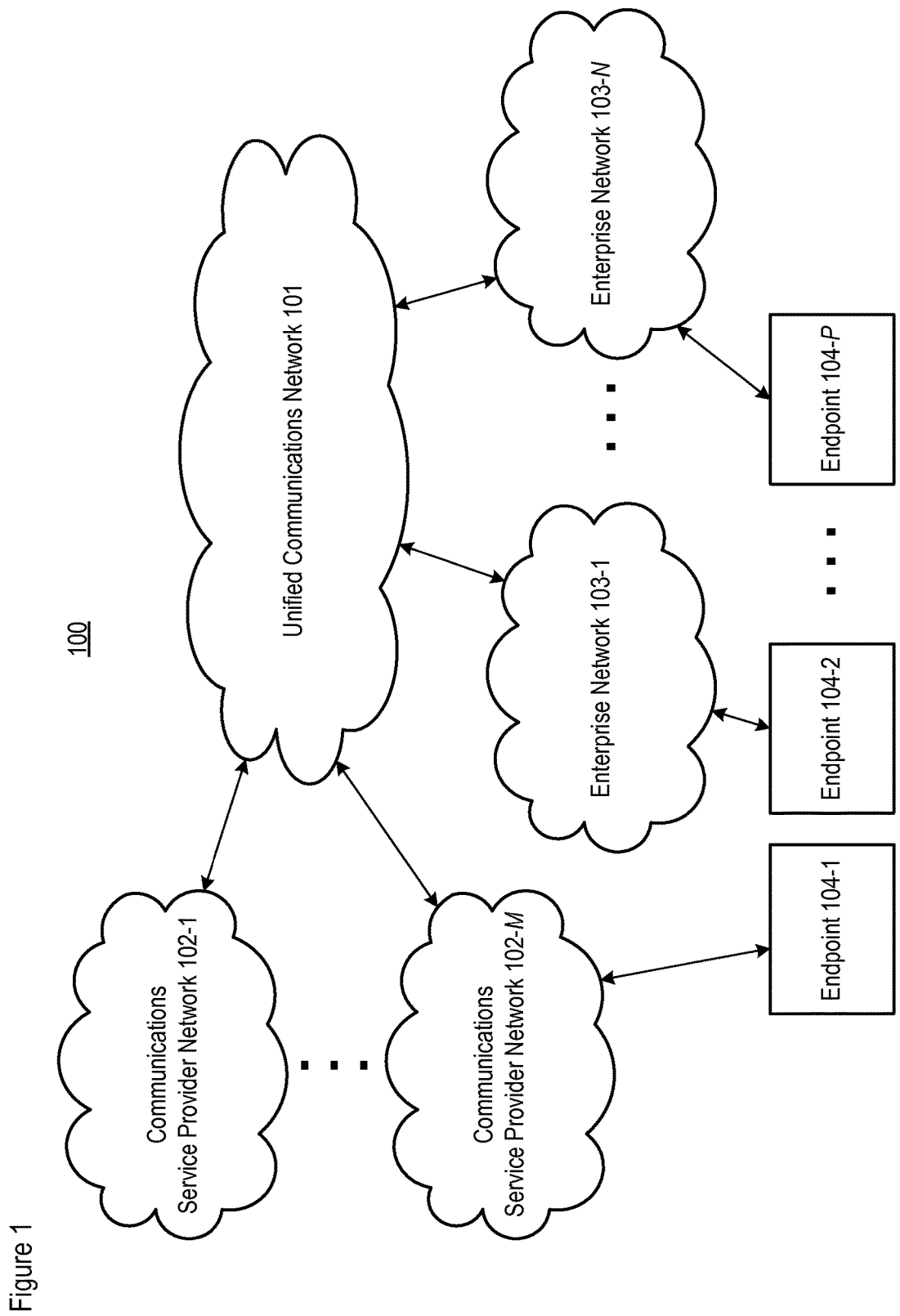
FIG. 1 depicts a schematic diagram of telecommunications system 100, in accordance with the illustrative embodiment of the present disclosure.

FIG. 1 depicts a schematic diagram of telecommunications system 100, in accordance with the illustrative embodiment of the present disclosure. System 100 comprises unified communications (UC) network 101, communications service provider (CSP) networks 102-1 through 102-M, enterprise networks 103-1 through 103-N, and communication endpoints 104-1 through 104-P, interconnected as shown. M, N, and P are positive integers whose values are independent of one another.

UC network 101 is a telecommunications backbone network. Network 101 is managed by one or more backbone providers or operators, and provides bandwidth for various unified communications services and network access to communication endpoints in one or more CSP networks 102-1 through 102-M and one or more enterprise networks 103-1 through 103-N. Generally, "unified communications" refers to the integration of real-time, enterprise, communication services. One of the services provided by network 101 is conferencing, including audio, web, and video conferencing. UC network 101 can be a first telecommunications network 101 that can comprise a conference management system, such as multi-domain conference manager (MDCM) 201. The MDCM can transmit messages (e.g., a first message 403, 407) that specify a subscription to events that involve a predetermined set of entities, to a second data processing system. The first message is explained in more detail with reference to FIG. 4 below. The second data processing system can be, for example, network management platform (NMP) 203. The salient components of UC network 101 are described below and in FIG. 2.

CSP network 102-$m$, wherein m can have a value of between 1 and M, inclusive, is a telecommunications network managed by a particular service provider or operator. Each CSP network 102-$m$ can be denoted as a "second telecommunications network." In other words, CSP network 102-$m$ and the expression "second telecommunications network" are used interchangeably throughout this description. Each CSP network 102-$m$ provides interconnectivity to its subscribers, such as the users of one or more communication endpoints that are associated with network 102-$m$, by allocating telecommunications resources that include voice and data communications resources and computing resources. Each CSP network 102-$m$ has one or more communication endpoints associated with it, as described below, and provides interconnectivity between each communication endpoint and a node that is external to the CSP network. There can be any number of such CSP networks present, as those who are skilled in the art will appreciate after reading this specification. The salient components of CSP network 102-$m$ are described below and in FIG. 2.

Enterprise network 103-$n$, wherein n can have a value of between 1 and N, inclusive, is a local telecommunications network. Each enterprise network 103-$n$ can be associated with a business organization and provides interconnectivity to its various company sites in order to share telecommunications resources, including voice and data communications resources and computing resources (e.g., equipment, processing power, memory, bandwidth, etc.). Each enterprise network 103-$n$ has one or more communication endpoints associated with it, as described below, and provides interconnectivity between each communication endpoint and a node that is external to the enterprise network. There can be any number of such enterprise networks present, as those who are skilled in the art will appreciate after reading this specification.

Each CSP network 102-$m$ and enterprise network 103-$n$ serves a separate domain. In the context of this specification, a domain can be a teleconferencing environment of a single organization, a closed user group, a company, or a community with logical (administration, policy, or management) and/or physical (network or security device) separation from other teleconferencing environments. A single domain can include one or more zones with logical and/or physical demarcations such as one that can be provided by a firewall, a router, or a session border controller (SBC), for example and without limitation. Each domain can be served by different technologies or protocols from one another, including different types of signaling such as SIP (Session Initiation Protocol), H.323, WebRTC (Web Real Time Communication), and TIP (Telepresence Interoperability Protocol), and different types of media codecs, such as H.264, H.265 and VP8.

Each communication endpoint 104-$p$, wherein p can have a value of between 1 and P, inclusive, is a node or terminal that provides access to one or more telecommunications services, such as audio or video conferencing, for one or more people or machines, or both. There can be any number of communication endpoints (or "endpoint") associated with each CSP network 102-$m$, any number of endpoints associated with each enterprise network 103-$n$, and different numbers of such endpoints across the CSP and enterprise networks.

Figure 2:
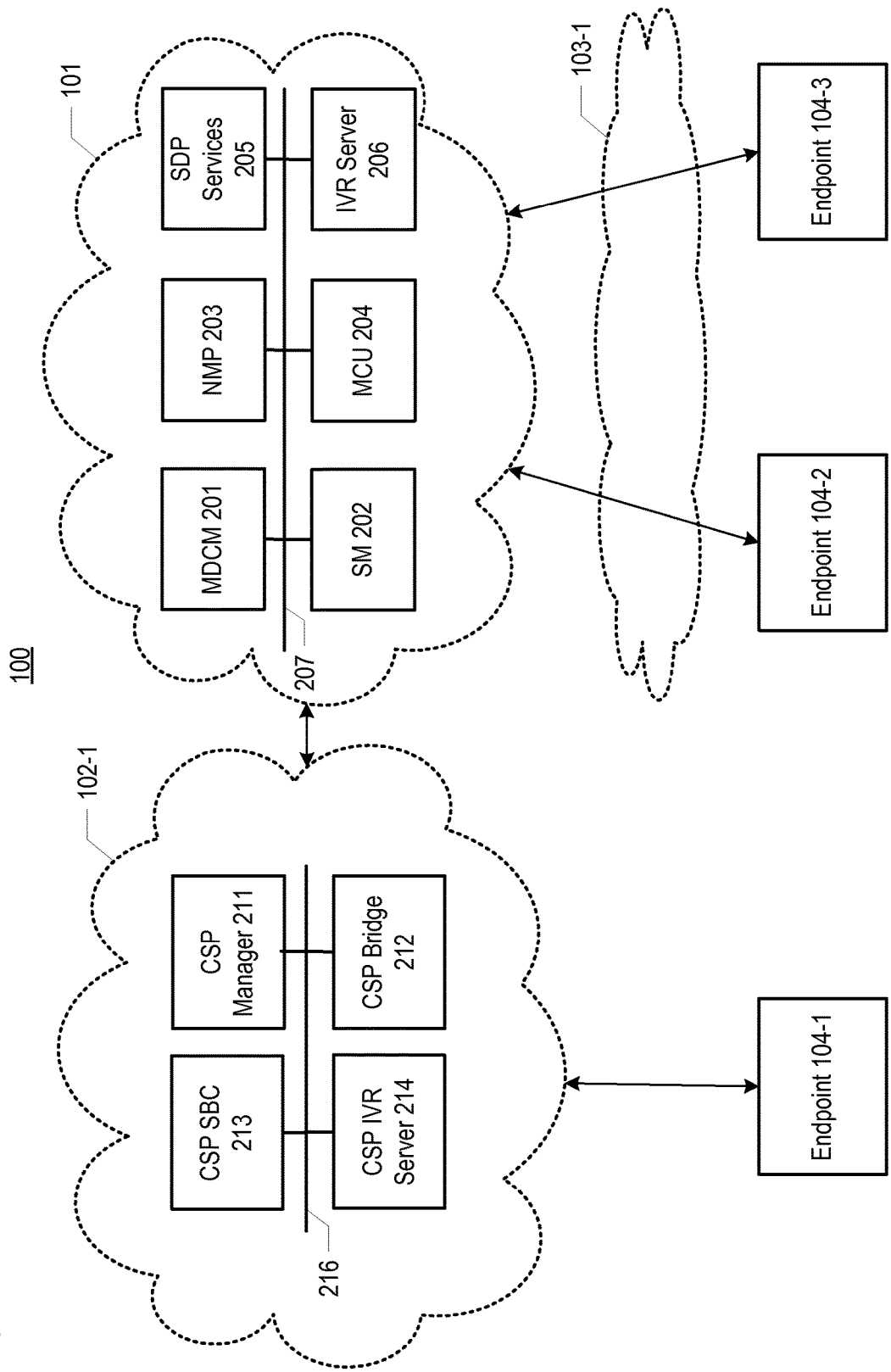
FIG. 2 depicts a schematic diagram of some of the salient data-processing systems within unified communications network 101 and communications service provider network 102-1, within system 100.

FIG. 2 depicts a schematic diagram of some of the salient data-processing systems within unified communications network 101 and communications service provider network 102-1, in accordance with the illustrative embodiment of the present disclosure. Telecommunications system 100, as depicted in FIG. 2 and consistent with FIG. 1, comprises UC network 101, CSP network 102-1 with associated endpoint 104-1, and enterprise network 103-1 with associated endpoints 104-2 and 104-3. Although particular networks and endpoints are depicted for pedagogical purposes, any combination of CSP networks, enterprise networks, and endpoints are also contemplated, as those who are skilled in the art will appreciate after reading this specification. Also, for clarity purposes, the communications infrastructure that is specific to enterprise network 103-1 is omitted from the figure, though it is to be understood that endpoints 104-2 and 104-3 are associated with the enterprise network.

Multi-domain conference manager (MDCM) 201 is a data-processing system that is configured, as a conference management system, to receive events from one or more networks that serve domains, such as CSP network 102-1 and enterprise network 103-1 as depicted, and to act on the received events. In other words, MDCM 201 and the expression "conference management system" are used interchangeably throughout this description. In particular, MDCM 201 is configured to subscribe to network management platform 203 for specific entities, including service providers, customers/tenants, contacts, and virtual meeting rooms (VMR). MDCM 201 can also subscribe to specific events relevant to the specific entity or entities for which each entity subscription is initiated. Consequently, MDCM 201 can receive notifications of the subscribed-to events, such as conference-start and conference-end notifications, as well as participant-level notifications, such as participant-connect and participant-disconnect. The subscriptions are made by each MDCM instance that MCDM 201 executes, wherein an "instance" is described in further detail below and in FIG. 3. MCDM 201 can transmit a first message 403, 407 that specifies a subscription to events that involve a predetermined set of entities, to a second data-processing system 203. The second data-processing system can be a network management platform (NMP) 203. In other words, NMP 203 and the expression "second data-processing system" are used interchangeably throughout the description.

MDCM 201 interfaces with CSP network manager 211 in each CSP network 102-$m$, session manager 202, and network management platform 203, as described below. CSP network manager 211 is also referred to as a third data-processing system 211. In other words, the CSP network manager 211 and the expression "third data-processing system" are used interchangeably throughout the description. When conference participants join on CSP network 102-1, for a UC-related conference that is being coordinated by UC network 101, MDCM 201 is configured to notify session manager 202 to establish cascaded media (e.g., audio, video, etc.) links between UC network 101 conference elements, such as MCU 204, and CSP bridge 212 that hosts the external, CSP-based participants. MCU 204 is also denoted a "first bridging device" 204. In other words, MCU 204 and the expression "first bridging device" 204 can be used interchangeably throughout the description. Further, CSP bridge 212 is also denoted a "second bridging device" 212. In other words, the terms "CSP bridge" 212 and "second bridging device" can be used interchangeably throughout this description. MDCM server computer 201 is described in further detail below and in FIG. 3.

In addition to receiving and acting on events, MDCM 201 is configured to provide a converged conference view of participants. This is possible because MDCM 201 is positioned within telecommunications system 100 with visibility of both i) teleconference participants who are connected into unified communications network 101 (e.g., through enterprise network 103-1, etc.) and its infrastructure and ii) teleconference participants who are connected through a CSP network (e.g., CSP network 102-1, etc.). As conference events (e.g. start/end) are received from NMP 203, MDCM 201 can maintain a current view of all active conferences in the network. Furthermore, MDCM 201 can maintain a current view of all participant legs (CSP- and MDCM-connected) and can maintain a current view of all active participants by using participant events (e.g. connect, disconnect) in notifications from NMP 203 and CSP manager 211.

Session manager (SM) 202 is a data-processing system configured to manage communication sessions among one or more telecommunications networks that serve domains, such as CSP network 102-1 and enterprise network 103-1 as depicted. SM 202 enables the domain-serving networks to interact with one another in one or more communication sessions, such as through the Session Initiation Protocol (SIP), for example and without limitation. SM 202 enables inter-domain audio and video communication sessions among the domains. When interfaced with SM 202, each domain-serving network can continue to employ and operate its own methods and technology. In some embodiments, SM 202 can include session management, resource management, policy, and routing components, for a variety of different communication sessions including, but not limited to, audio and/or video based communication sessions, and applications such as web conferencing and any third party software that is designed to handle video or audio (e.g., voice, etc.).

SM 202, in some embodiments, is configured to perform one or more of the following functions, in any combination, and under the control of or with information provided by MDCM 201:
  i. receive and analyze a communication session request (signaled by a telephony or web protocol) from one or more endpoints (users including, without limitation, software clients, hardware based endpoints, web clients running on mobile devices, and the like);
  ii. determine the viability of a communication session based on one or more attributes of the session;
  iii. connect one or more requesting endpoints to another device (e.g., another endpoint, MCU 204, IVR 206, etc.) to start the session;
  iv. establish cascaded links (e.g., audio links, etc.) between devices within UC network 101 (e.g., MCU 204, etc.) and devices within CSP network 102-1 (e.g., bridge 212, etc.).
  v. continuously or periodically monitor the session for problems with or changes in the session; and
  vi. alter the parameters of the session in accordance with one or more predetermined policies, if a problem or change is detected, in order to maintain the viability of the session.

SM 202, in other embodiments, can also be configured to originate one or more communication sessions.

SM 202 as depicted in FIG. 2 is part of UC network 101. However, SM 202 can physically and/or logically be part of a network different than UC network 101, as those who are skilled in the art will appreciate after reading this disclosure. Furthermore, SM 202 store one or more instances of session management functionality, wherein multiple instances can be implemented in UC network 101 (e.g., for multiple teleconferences, for resilience, etc.).

Network management platform (NMP) 203 is a data-processing system that provides network management, reporting, analytics, mass provisioning, scheduling, billing, and conference management. For example and without limitation, NMP 203 can comprise a server computer that executes Synergy SKY™ software with network management functionality. Such functionality can include provisioning, scheduling, MCU allocation, monitoring, reporting, and/or billing capability, for example and without limitation. NMP 203 is configured to receive, from one or more MCUs 204, indications of conference- and participant-related events as they occur, as detected by the MCUs. NMP 203 is configured to receive subscriptions from MDCM 201, as described above, to monitor for events related to those entities identified in each subscription, and to report to MDCM 201 on events that occur within the scope of management of each MDCM instance that executes on MDCM 201.

In at least some embodiments of the present disclosure, NMP 203 reports only on those events that occur within the scope of management of each instance, as specified in the subscriptions received from MDCM 201, rather than on every event reported to the NMP by the one or more MCUs 204.

Multipoint control unit (MCU) 204 is a data-processing system that is configured to interconnect (i.e., "bridge") calls from multiple sources. The multipoint control unit is a node in the network that provides the capability for multiple enterprise-associated endpoints to participate in a multipoint videoconference via bridging those endpoints. For example and without limitation, MCU 204 can comprise one or more Acano™ units with multipoint control functionality. In addition, MCU 204 can interface via a cascaded link with CSP bridge 212. Although a single MCU is depicted as being associated with UC network 101, multiple MCUs can operate within UC network 101, as those who are skilled in the art will appreciate after reading this specification. Furthermore, one or more MCUs can be bridges, proxy servers, gateways, and any combination and number of media data-processing systems thereof.

In addition, MCU 204 is capable of notifying NMP 203 of conference- and participant-related events as they occur. In some embodiments, the event notifications are made in the form of call-detail records (CDR). In general, a CDR is a data record that documents the details of a telephone call or other communications transaction. The record contains various attributes of the call, such as time, duration, completion status, source number, and/or destination number, for example and without limitation.

Service delivery platform (SDP) services 205 provide a structure for service delivery, including controls for service sessions and protocols for service use. It is in this capacity that SDP services 205 can provide authentication (e.g., PIN-based, etc.) for one or more endpoints. The SDP data can keep MDCM 201 informed on the overall topology of unified communications network 101 (e.g., enterprises, contacts, virtual meeting rooms, etc.).

IVR server 206 is a data-processing system that is configured to provide a waiting room capability (e.g., with music-on-hold, etc.) prior to a communication session actually starting.

The aforementioned elements within UC network 101 are interconnected, at least in part, via network connectivity 207, which can comprise one or more subnetworks.

As those who are skilled in the art will appreciate, after reading this specification, a division of functionality that is different than in the description above is possible within UC network 101. For example and without limitation, at least some of the elements described above can be implemented on one or more server computers, or two or more of the elements described above can implemented on the same server computer, or both.

CSP manager 211 is a data-processing system that provides a "watch" registration and notification capability. What the "watch" registration entails is that the CSP Network Manager application notifies MDCM 201 of activities related to a conference being monitored, as described below and in FIGS. 4A-4D.

CSP bridge 212 is a data-processing system that provides teleconference bridge capability within the CSP network that it serves. The multipoint control unit is a node in the network that provides the capability for multiple CSP-associated endpoints to participate in a multipoint conference via bridging those endpoints within CSP network 102-1. In addition, CSP bridge 212 can interface via a cascaded link with MCU 204. Although a single CSP bridge is depicted as being associated with CSP network 102-1, multiple CSP bridges can operate within CSP network 102-1, as those who are skilled in the art will appreciate after reading this specification. Furthermore, one or more CSP bridges can be bridges, proxy servers, gateways, and any combination and number of media data-processing systems thereof.

In addition, CSP bridge 212 is capable of notifying CSP manager 211 of bridge-related activities as they occur. In some embodiments, the notifications are made in the form of call-detail records (CDR).

CSP session border controller (SBC) 213 is a data-processing system that governs the manner in which sessions are initiated, conducted, and terminated on a Voice over Internet Protocol (VoIP) network, in which at least one of the endpoints involved in the session is associated with CSP network 102-1.

CSP IVR 214 is a data-processing system that is configured to provide a waiting room capability (e.g., with music-on-hold, etc.) prior to a communication session actually starting, to an endpoint that is associated with CSP network 102-1, such as endpoint 104-1 as depicted.

The aforementioned elements within CSP network 102-1 are interconnected, at least in part, via network connectivity 216, which can comprise one or more subnetworks.

As those who are skilled in the art will appreciate, after reading this specification, a division of functionality that is different than in the description above is possible within CSP network 102-1. For example and without limitation, at least some of the elements described above can be implemented on one or more server computers, or two or more of the elements described above can implemented on the same server computer, or both.

In some embodiments of the present disclosure, CSP network 102-1 can further comprise one or more service provider routers, one or more load balancers, and/or one or more signaling servers. One or more of these components can scale in number and can be in different physical locations.

Figure 3:
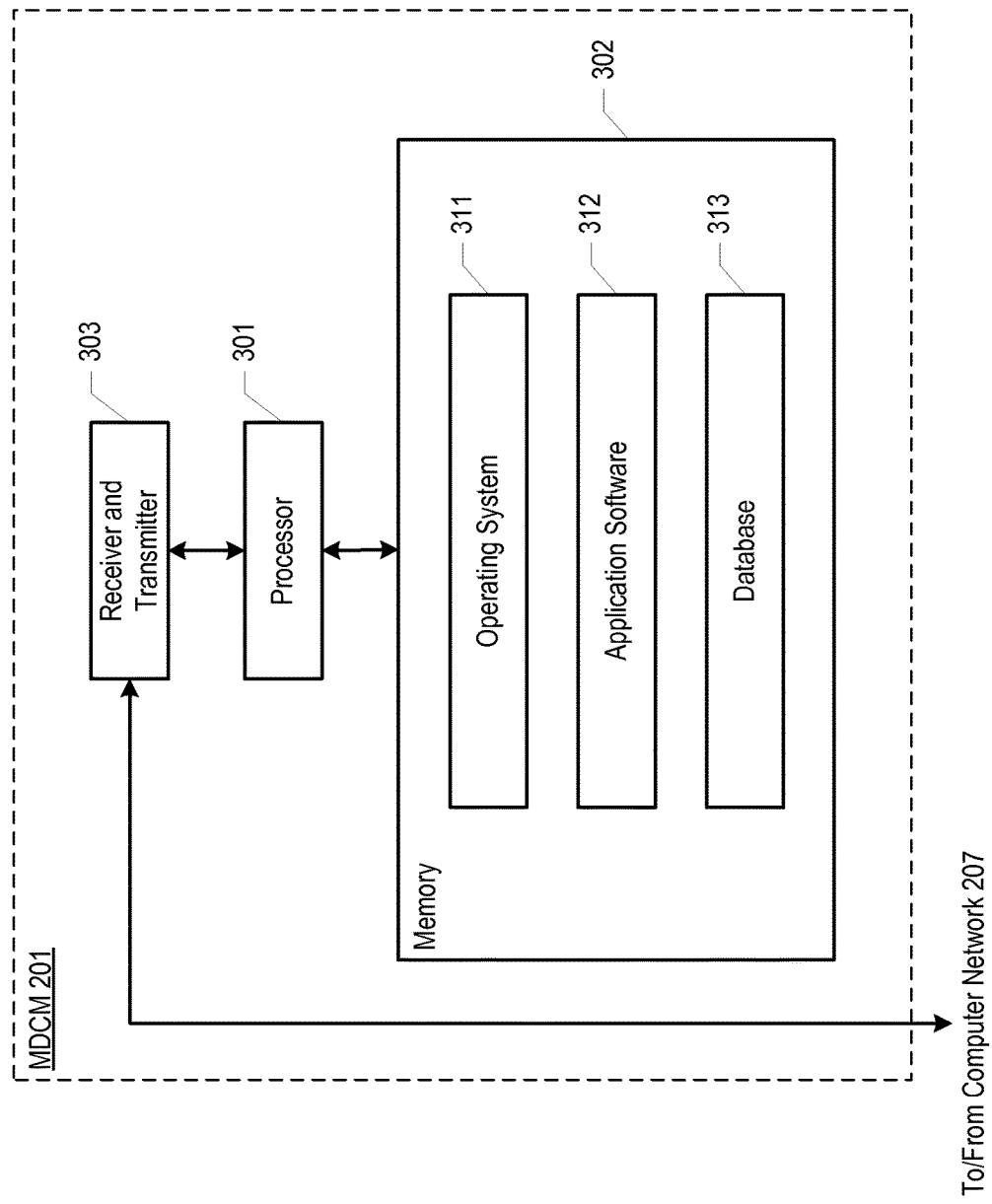
FIG. 3 depicts a schematic diagram of multi-domain conference manager (MDCM) 201, situated within network 101.

FIG. 3 depicts a schematic diagram of the multi-domain conference manager (MDCM) 201 data-processing system, in accordance with the illustrative embodiment of the present disclosure. MDCM 201 can be implemented in hardware, software, or a combination of hardware and software. Although MDCM 201 is depicted as a single server computer, software components of MDCM functionality can reside in multiple server computers, or in one or more like computing devices or machines, for that matter. The server computers or like computing devices or machines can comprise one or more central processing units (processors) and one or more memory devices. The structure and function of such server computers and the like are well known to those skilled in the art.

In accordance with the illustrative embodiment of the present disclosure, MDCM 201 comprises, as a conference management system: processor 301, memory 302, and receiver and transmitter 303, which are interconnected as shown. In accordance with the illustrative embodiment of the present disclosure, MDCM 201 is a server computer. As those who are skilled in the art will appreciate after reading this specification, however, MDCM 201 can be a different type of data-processing system or computing device.

Processor 301 is a general-purpose processor that is configured to execute an operating system and the application software that performs the operations described herein, including at least some of the operations described in FIGS. 4A through 4D and 5A through 5C, as well as in other figures. It will be clear to those skilled in the art how to make and use processor 301.

Memory 302 is a non-volatile memory that is configured to store:
 a. operating system 311, and
 b. application software 312, and
 c. database 313.

Memory 302 can store one or more software instances of multi-domain conference manager (MDCM) functionality, wherein multiple instances can be implemented in UC network 101. For resilience purposes, a pair of MDCM instances can be implemented in a primary/standby arrangement. Each MDCM instance (or pair of instances) can be dedicated to handling a given set of entities within its management scope. For example and without limitation, a first instance can handle a first business enterprise customer and its service agreements with UC network 101 one or more CSP networks 102, a second instance can handle a second business enterprise customer and its service agreements, and so on.

Each MDCM instance, or "conference management instance", has multiple external software interfaces, including CSP adapters (i.e., one for the interface to CSP manager 211 within each CSP network 102-*m*), SDP data access, a session manager interface, and a network management platform interface. In some embodiments, the software interface to each CSP manager 211 across multiple CSP networks has some proprietary implementation, so that these software interfaces can be abstracted into a set of CSP adapters. For resilience and availability purposes, each MDCM instance can operate independently from the SDP platform that is retrieving all requisite data from SDP periodically. As noted earlier, when a cascaded link needs to be established or torn down, the serving MDCM instance will interface with a session manager component to facilitate this. A network management client interface can be implemented to subscribe to and receive events from network management platform 203.

It will be clear to those skilled in the art how to make and use memory 302.

Receiver and transmitter 303 is configured to MDCM 201 to receive from and transmit to other elements within telecommunications system 100, including session manager 202, network management platform 203, and CSP manager 211, for example and without limitation. It will be clear to those skilled in the art how to make and use receiver and transmitter 303.

FIGS. 4A through 4D and 5A through 5C depict message flow diagrams that represent at least some of the salient, operational logic of MDCM 201 and some of the other elements in telecommunications system 100. In particular, the figures feature i) the subscribing to one or more events that concern entities in multiple domains and ii) the processing of communication sessions based on the subscribed-to teleconference events. The techniques disclosed herein, however, can be applied to other types of conferencing events, as those who are skilled in the art will appreciate after reading this specification.

In regard to the methods represented by the disclosed operations and messages, it will be clear to those having ordinary skill in the art, after reading the present disclosure, how to make and use alternative embodiments of the disclosed methods wherein the recited operations, sub-operations, and messages are differently sequenced, grouped, or sub-divided—all within the scope of the present disclosure. It will be further clear to those skilled in the art, after reading the present disclosure, how to make and use alternative embodiments of the disclosed methods wherein some of the described operations, sub-operations, and messages are optional, are omitted, or are performed by other elements and/or systems.

FIGS. 4A through 4D depict message flow diagrams that represent at least some of the salient, operational logic of MDCM 201 and some of the other elements in telecommunications system 100, involved in provisioning and managing a conference that spans domains, in accordance with the illustrative embodiment of the present disclosure. In particular, FIGS. 4A through 4D depict interactions among MDCM 201, SM 202, NMP 204, and CSP manager 211.

Figure 4A:
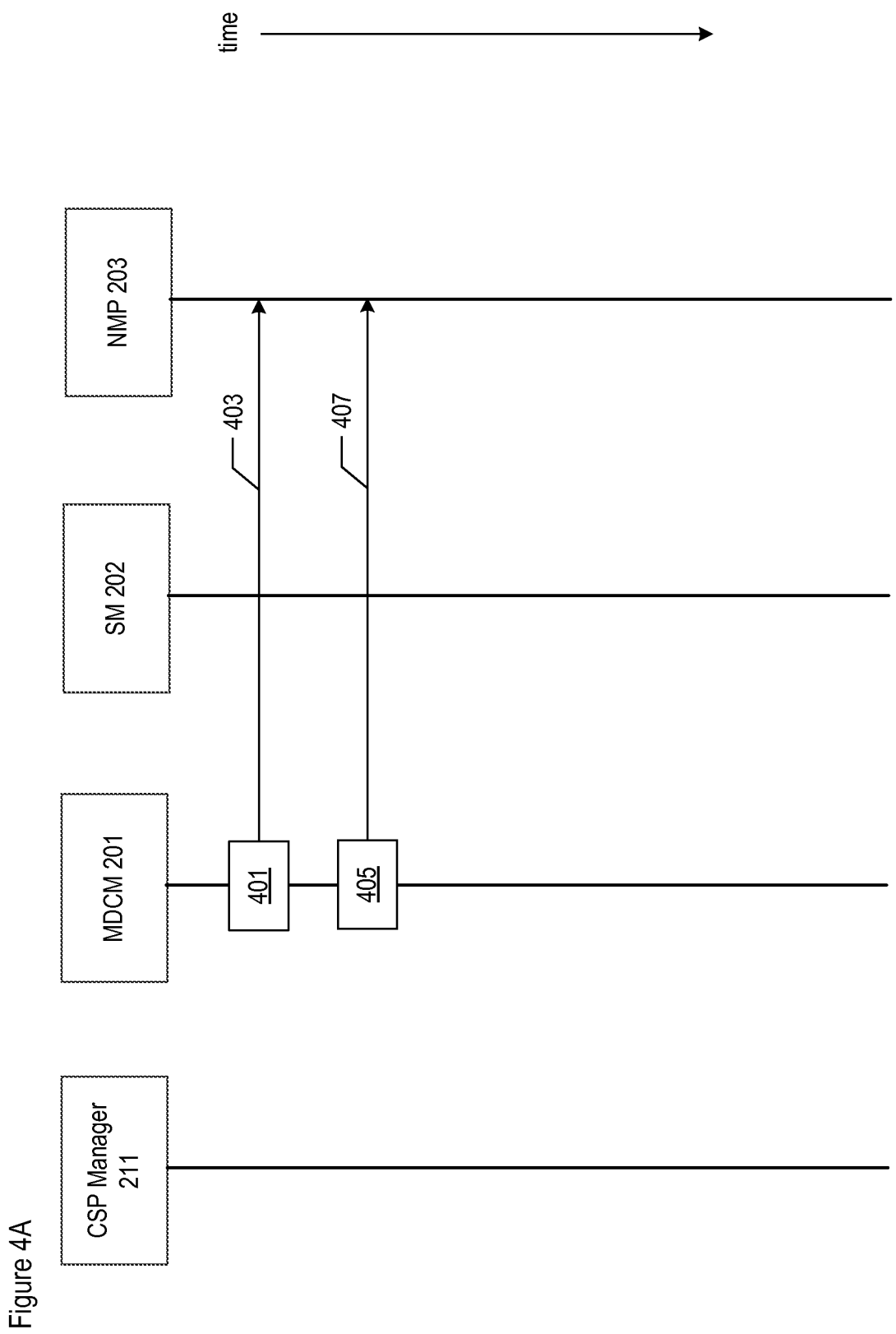

FIG. 4A depicts operations that concern the provisioning of resources across multiple conference domains. At operation 401, an MDCM instance executed by MDCM 201 subscribes for (i.e., registers with) NMP 204, via one or more messages 403, for all entities (e.g., service providers, enterprises/tenants, contacts, virtual meeting rooms, etc.) that are within the instance's deployment scope. Each instance handles a specific "scope" (e.g., one or more CSP networks, one or more enterprise networks, one or more combinations of CSP and enterprise networks, etc.)

At operation 405, an instance executed by MDCM 201 subscribes, via one or more messages 407, for all events related to one or more conferences (e.g., conference start, conference end, etc.) and related to conference participants (e.g., participant connecting, connected, disconnected) affecting or involving the aforementioned entities. For example, a given MDCM instance might subscribe to events that occur for a conference that it identifies to NMP 203 with a unique conference identification, such as "conf_ID:123"; consequently, NMP 203 going forward will monitor for all such events occurring for conf_ID:123. The one or more messages 403 and the one or more messages 407 for the subscription of an instance executed by MDCM 201 can be combined in a first message 403, 407. In other words, the first message 403, 407 can comprise the one or more messages 403 and/or the one or more messages 407. The first message 403, 407 can specify a subscription to events that involve a predetermined set of entities. The predetermined set of entities can comprise an enterprise and a communications service provider, wherein the communications service provider manages the second telecommunications network 102-1.

FIG. 4B depicts operations that concern the events leading to the adding of a cascaded link. At operation 411, NMP 203 notifies MDCM 201 via message 413 of a conference event occurring. The message 413 of a conference event occurring is also referred to as "second message" 413 throughout the description. The second message 413 can specify that a first conference is starting, wherein the first conference involves the set of entities identified in the first message 403, 407. Moreover, the first conference can be identified by a first conference ID in the second message. Further, in response to the receiving of the second message, a second conference ID can be determined. The second conference ID can serve to identify the first conference to the third data processing system 211. In response, at operation 415, MDCM 201 cross references the unique conference ID provided in message 413 with the conferences that an MDCM instance already has in its cache, in order to determine if it is already noted as active in its cache. Provided that the conference is new and not already established in its cache, the MDCM instance verifies that the entity (VMR, contact, tenant, service provider) are within its scope of management. If the conference is new and in scope, the MDCM instance creates a new managed conference record in its cache. Operation 411 and message 413 correspond to operation 522 and message 523, respectively, in FIG. 5A.

MCDM 201 also looks up whether the conference of the particular MDCM instance includes participants in domains outside of UC network 101 and determines the conference ID to which to refer when communicating with the outside network. For example, if conference "conf_ID:123" has started and "conf_ID:123" has at least one endpoint participant calling into the conference with a CSP-supplied conference ID of "conf_ID:789", MDCM 201 retrieves the CSP-supplied conference ID for future use.

MDCM 201 can receive from NMP 203, for one or more applicable MDCM instances, notifications of conference-level information including the bridge name, unique conference ID, NMP VMR GUID, conference name, customer name, start time, end time, and number-of-participant information, and subsequently base the adding of a cascaded link on one or more of these.

At operation 417, once a UC conference start event is received (e.g., via message 413) for a scoped conference, an MDCM instance executed by MDCM 201 can initiate a "watch" on the CSP conference manager application for all activities related to the conference, by transmitting message 419 to CSP manager 211. Message 419 is also referred to as "third message" 419 throughout the description. The third message 419 can specify to the third data processing system 211 to monitor for activities related to the first conference. What the "watch" registration entails is that CSP manager will notify MDCM 201 of activities related to the conference being monitored. For example, having accessed the CSP-supplied conference ID of "conf_ID:789", MDCM 201 includes this ID in message 419 to identify the conference of interest.

At operation 421, CSP manager 211 stores the watch initiation and starts the monitoring of for all activities related to the conference (e.g., conf_ID:789, etc.).

At operation 423, CSP manager 211 notifies MDCM 201 via message 425 of an activity occurring that is related to the conference identified in message 419. Message 425 is also referred to as "fourth message" 425 throughout the description. The fourth message 425 can specify the first conference. Upon receiving the fourth message 425, the MDCM 201 can establish a communications link 655 between a first bridging device 204 and a second bridging device 212, wherein the first bridging device 204 is located in a first telecommunications network and the second bridging device 212 is located in a second communications network different from the first communications network. This might occur because CSP bridge 212 might have been already handling at least one participant leg in the conference prior to the CSP manager storing the watch initiation at operation 421. Alternatively, it might occur because the CSP bridge adds a first participant leg subsequent to operation 421. Operation 423 and message 425 correspond to operation 594 and message 595, respectively, in FIG. 5B.

At operation 427, in response to receiving message 425, MDCM 201 starts the process of adding cascaded link 655 (in FIG. 6) to the conference. The cascaded link 655 can be communications link 655. In other words, the term "cascaded link" 655 and "communication link" 655 are used interchangeably throughout this application. Operation 427 corresponds to operation 597 in FIG. 5C. This has the technical advantage that the cascaded link between the different networks can be established more efficiently and more quickly such that the session can be opened more efficiently.

Figure 4C:
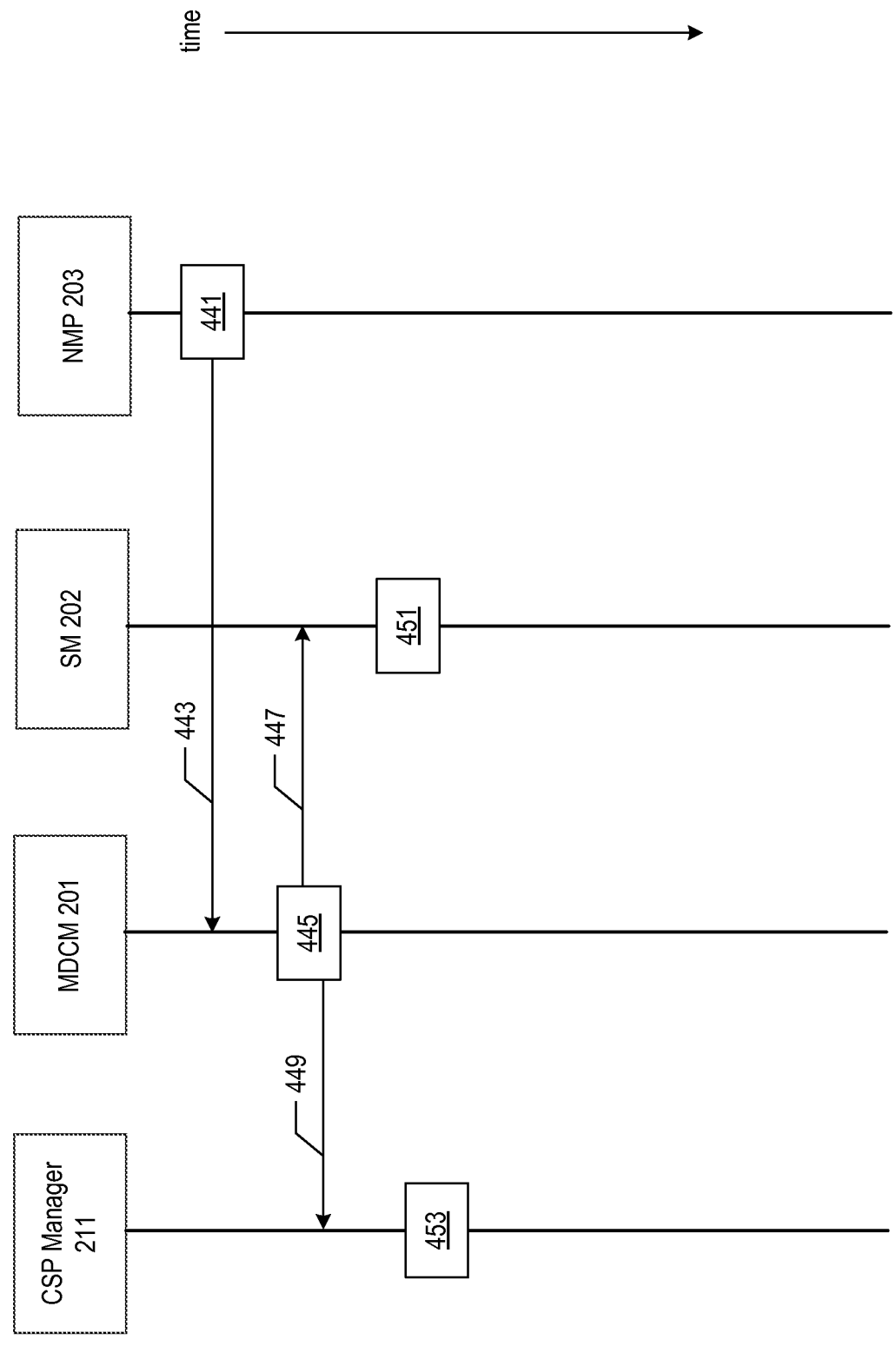

FIG. 4C depicts operations that concern the events reported by NMP 203 leading to the dropping of a cascaded link for a particular conference. At operation 441, NMP 203 notifies MDCM 201 via message 443 of a conference end occurring for the particular conference. In response, at operation 445, the MDCM instance determines if the conference end event is for a conference it has in its active-conference list. If the conference end event is for a conference that MDCM 201 is currently managing, MDCM 201 initiates processes to tear down any cascaded links related to the conference, by transmitting message 447 to SM 202. In addition, MDCM 201 stops any active watches at CSP manager 211 for the conference, by transmitting message 449 to CSP manager 211. The MDCM instance changes the state of the conference in its active cache and removes it from its active-conference cache.

MDCM 201 can receive from NMP 203, for one or more applicable MDCM instances, notifications of conference-end information including the bridge name, unique conference ID, NMP VMR GUID, conference name, customer name, start time, end time, and number-of-participant information, and subsequently base the dropping of a cascaded link on one or more of these.

At operation 451, in response to receiving message 447, session manager 202 coordinates the dropping of the cascaded link for the particular conference.

At operation 453, in response to receiving message 449, CSP manager 211 stops the watch related to the particular conference.

Figure 4D:
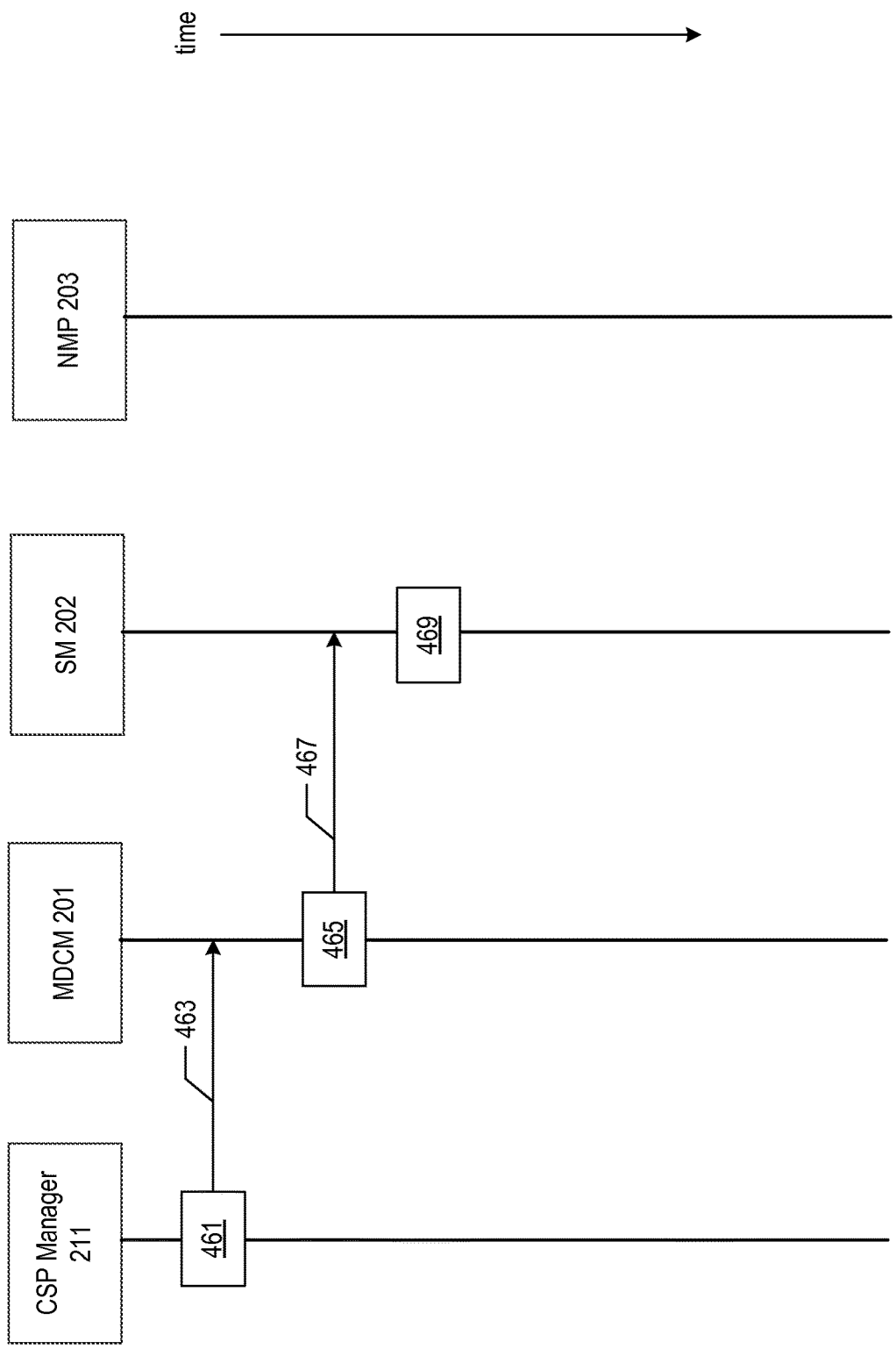

FIG. 4D depicts operations that concern the events reported by CSP manager 211 leading to the dropping of a cascaded link. At operation 461, CSP manager 211 transmits message 463 to MDCM 201, indicating that the last CSP participant leg has dropped from CSP bridge 212 for a particular conference.

At operation 465, in response to receiving message 463 for a particular conference, MDCM 201 transmits message 467 to SM 202 after a configured time interval, instructing the session manager to drop cascaded link 655 that was being used for the conference.

At operation 469, in response to receiving message 467, session manager 202 coordinates the dropping of the cascaded link. This has the technical advantage that the cascaded link can be dropped efficiently once a determination is made that the cascaded link is no longer necessary. Hence the resources involved in establishing the cascaded link are dropped in a timely manner and hence available for new sessions.

Figure 5A:
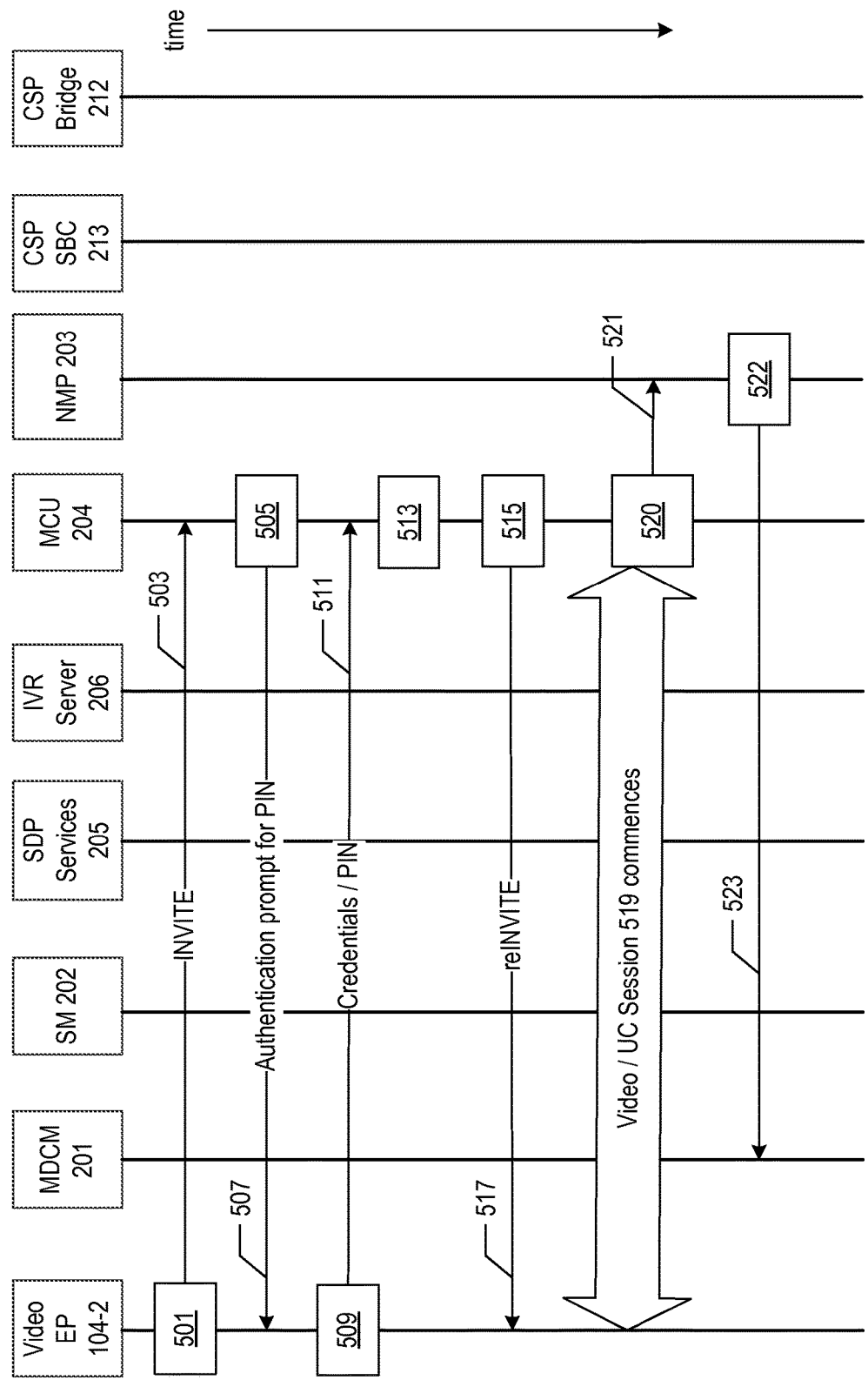
FIGS. 5A through 5C depict message flow diagrams associated with establishing a cascaded audio link as part of a conference that spans multiple domains in system 100
Figure 5B:
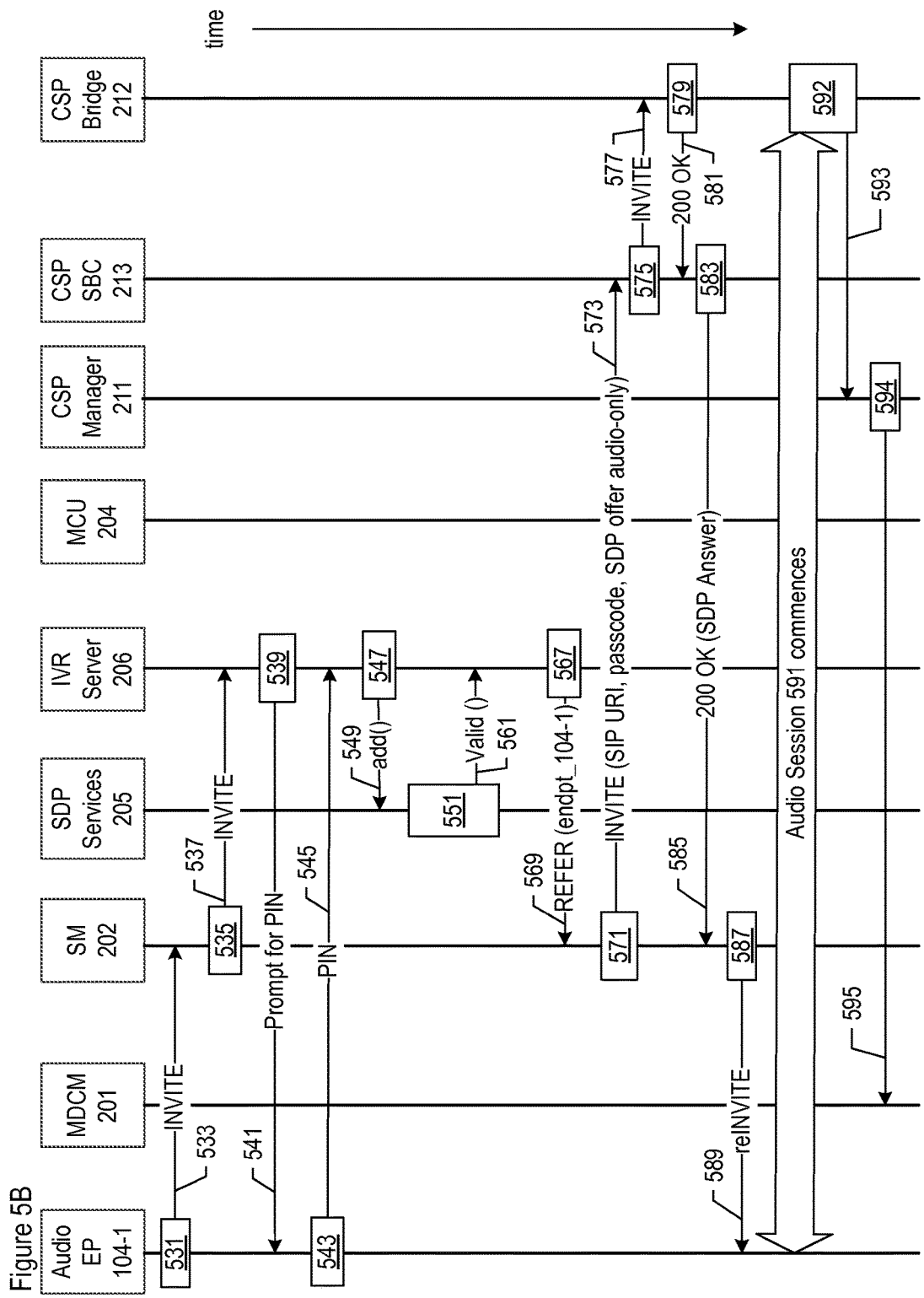
Figure 5C:
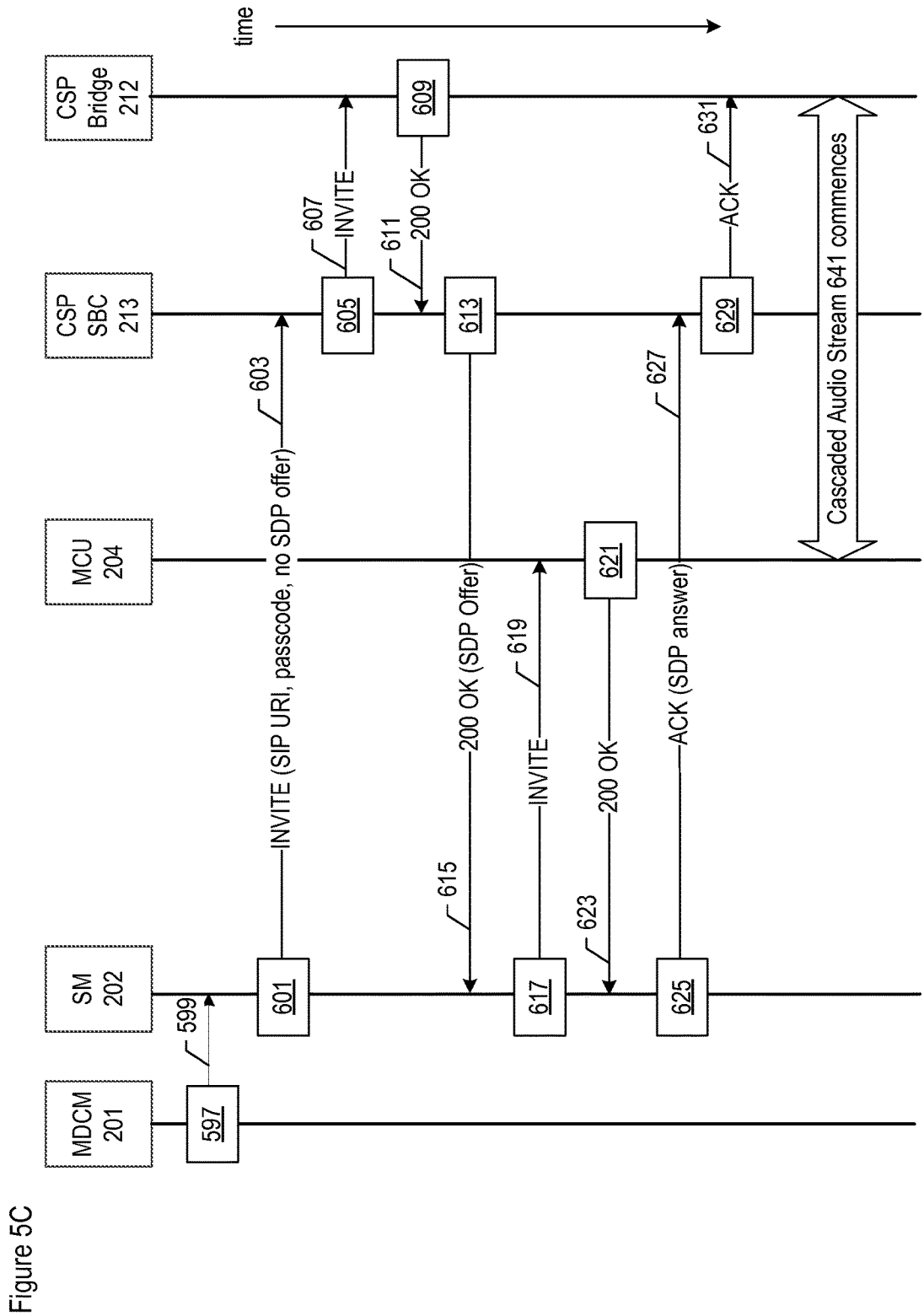

FIGS. 5A through 5C depict message flow diagrams associated with establishing a cascaded audio link as part of a conference that spans multiple domains, in accordance with the illustrative embodiment of the present disclosure. For pedagogical purposes, the operations described below support a scenario in which a conference is be conducted by a team of employees of a business enterprise that has access to UC network 101 and managed services on one or more CSP networks 102. In particular, the business enterprise has access to video services on network 101 and to low-cost voice services on network 102-1. It is in the best interests of this business enterprise to leverage as fully as possible not only the video conferencing resources to which it has access in UC network 101, but also the audio conferencing resources in CSP network 102-1.

In support of the foregoing scenario, the figures depict the initialization and starting of a subscribed-to teleconference event, in which signaling and call control elements of i) a video communication session attempt involving enterprise-associated endpoint 104-2 and ii) an audio communication session attempt involving CSP-associated endpoint 104-1, have been triggered or requested as part of a teleconference that involves both endpoints 104-1 and 104-2. Although the subscribing to one or more events and initialization and starting of a subscribed-to teleconference event are featured, the techniques disclosed herein can be applied to other sets of communication sessions being initialized and started, as those who are skilled in the art will appreciate after reading this specification.

In accordance with the illustrative embodiment of the present disclosure, at least some of the messages are exchanged in accordance with the Session Initiation Protocol (SIP). As those who are skilled in the art will appreciate, after reading this specification, one or more of the depicted SIP messages can be based on a different protocol.

FIG. 5A depicts the setting up of a video/UC session between endpoint 104-2 and MCU 204, which serves as a video bridge. As those who are skilled in the art will appreciate after reading this specification, a different type of bridge can be contacted to set up a different type of session (e.g., audio, etc.).

At operation 501, based on an indication it detects from its user, endpoint (EP) 104-2 transmits INVITE message 503 to MCU 204.

At operation 505, in response to receiving message 503, MCU 204 transmits message 507 comprising an authentication prompt for a PIN (personal identification number), to endpoint 104-2.

At operation 509, in response to receiving message 507, endpoint 104-2 transmits message 511 comprising credentials and the PIN, to MCU 204.

At operation 513, in response to receiving message 511, MCU 204 coordinates PIN authentication in well-known fashion.

At operation 515, based on the results of operation 513, MCU 204 transmits reINVITE message 517 to endpoint 104-2. This serves to complete the setup of video/unified communications session 519 between endpoint 104-2 and MCU 204, resulting in the commencement of the session.

At operation 520, based on detecting session 519 having commenced, MCU 204 transmits message 521 to NMP 203. In response to receiving message 521, NMP 203 at operation 522 checks to see that it has been previously instructed to monitor for events related to the current conference (i.e., in a subscription from MDCM 201) and, as a result, transmits message 523 to MDCM 201. This message indicates to MDCM 201 that a connection now exists between endpoint 104-2 and MCU 204 for the particular conference identified. In some alternative embodiments, message 523 or equivalent can be sent to MDCM 201 from a different element and/or at a different point in the depicted message flow, in order to indicate that the aforementioned connection exists.

FIG. 5B depicts the setting up of an audio session between endpoint 104-1 and CSP bridge 212, which serves as an audio bridge. As those who are skilled in the art will appreciate after reading this specification, a different type of bridge can be contacted to set up a different type of session (e.g., video, etc.).

The operations and messages depicted in FIG. 5B correspond to each CSP audio participant joining, wherein multiple participants can be joined by executing the depicted operations for each CSP participant's endpoint. Furthermore, although the operations depicted in FIG. 5B are depicted as following the operations depicted in FIG. 5A, the operations in FIG. 5B can be performed concurrently with the performing of the operations in FIG. 5A, or even ahead of those operations.

At operation 531, based on an indication it detects from its user, endpoint (EP) 104-1 transmits INVITE message 533 to SM 202.

At operation 535, in response to receiving message 533, SM 202 transmits INVITE message 537 to IVR server 206.

At operation 539, in response to receiving message 537, IVR server 206 transmits message 541 comprising a prompt for a PIN, to endpoint 104-1.

At operation 543, in response to receiving message 541, endpoint 104-1 transmits message 545 comprising the PIN, to IVR server 206.

At operation 547, in response to receiving message 545, IVR server 206 contacts SDP services 205 via message 549 in order to perform authentication.

At operation 551, in response to receiving message 549, SDP services 205 coordinates PIN authentication in well-known fashion. When the SDP services authenticate successfully endpoint 104-1, message 561 is transmitted to IVR server 206.

At operation 567, in response to receiving message 561, IVR server 206 transmits REFER message 569 to SM 202, indicating audio endpoint 104-1.

At operation 571, in response to receiving message 569, SM 202 transmits INVITE message 573 to CSP session border controller (SBC) 213, providing a SIP URI, passcode, and indicating an SDP offer of "audio only".

At operation 575, in response to receiving message 573, CSP SBC 213 transmits INVITE message 577 to CSP bridge 212.

At operation 579, in response to receiving message 577, CSP bridge 212 transmits "200 OK" message 581 to CSP SBC 213.

At operation 583, in response to receiving message 581, CSP SBC 213 transmits "200 OK" message 585 to SM 202, indicating "SDP answer".

At operation 587, in response to receiving message 585, SM 202 transmits reINVITE message 589 to endpoint 104-1. This serves to complete the setup of audio session 591 between endpoint 104-1 and CSP bridge 212, resulting in the commencement of the session.

At operation 592, based on detecting session 591 having commenced, CSP bridge 212 transmits message 593 to CSP manager 211. In response to receiving message 593, CSP manager 211 at operation 594 checks to see that it has been instructed to monitor for events related to the current conference (i.e., in a watch notification from MDCM 201) and, as a result, transmits message 595 to MDCM 201. This message indicates to MDCM 201 that a connection now exists between endpoint 104-1 and CSP bridge 212 for the particular conference identified. In some alternative embodiments, message 595 or equivalent can be sent to MDCM 201 from a different element and/or at a different point in the depicted message flow, in order to indicate that the aforementioned connection exists.

FIG. 5C depicts the setting up the cascaded audio link between MCU 204, which is presently serving as a video bridge for enterprise-associated endpoint 104-2, and CSP bridge 212, which is presently serving as an audio bridge within CSP network 102-1 for CSP-associated endpoint 104-1. As those who are skilled in the art will appreciate after reading this specification, a different type of cascaded link can be set up (e.g., video, etc.).

At operation 597, based on having received messages 521 and 593 informing about the sessions described in FIGS. 5A and 5B having been set up, MDCM 201 transmits message 599 to SM 202.

At operation 601, in response to receiving message 599, SM 202 transmits INVITE message 603 to CSP session border controller (SBC) 213, providing a SIP URI, passcode, and an indication of "no SDP offer".

At operation 605, in response to receiving message 603, CSP SBC 213 transmits INVITE message 607 to CSP bridge 212.

At operation 609, in response to receiving message 607, CSP bridge 212 transmits "200 OK" message 611 to CSP SBC 213.

At operation 613, in response to receiving message 611, CSP SBC 213 transmits "200 OK" message 615 to SM 202, indicating "SDP offer".

At operation 617, in response to receiving message 615, SM 202 transmits INVITE message 619 to MCU 204.

At operation 621, in response to receiving message 619, MCU 204 transmits "200 OK" message 623 to SM 202.

At operation 625, in response to receiving message 623, SM 202 transmits ACK message 627 to CSP SBC 213, indicating "SDP answer".

At operation 629, in response to receiving message 627, CSP SBC 213 transmits ACK message 631 to CSP bridge 212. This serves to complete the setup of cascaded audio stream 641 between MCU 204 and CSP bridge 212.

Figure 6:
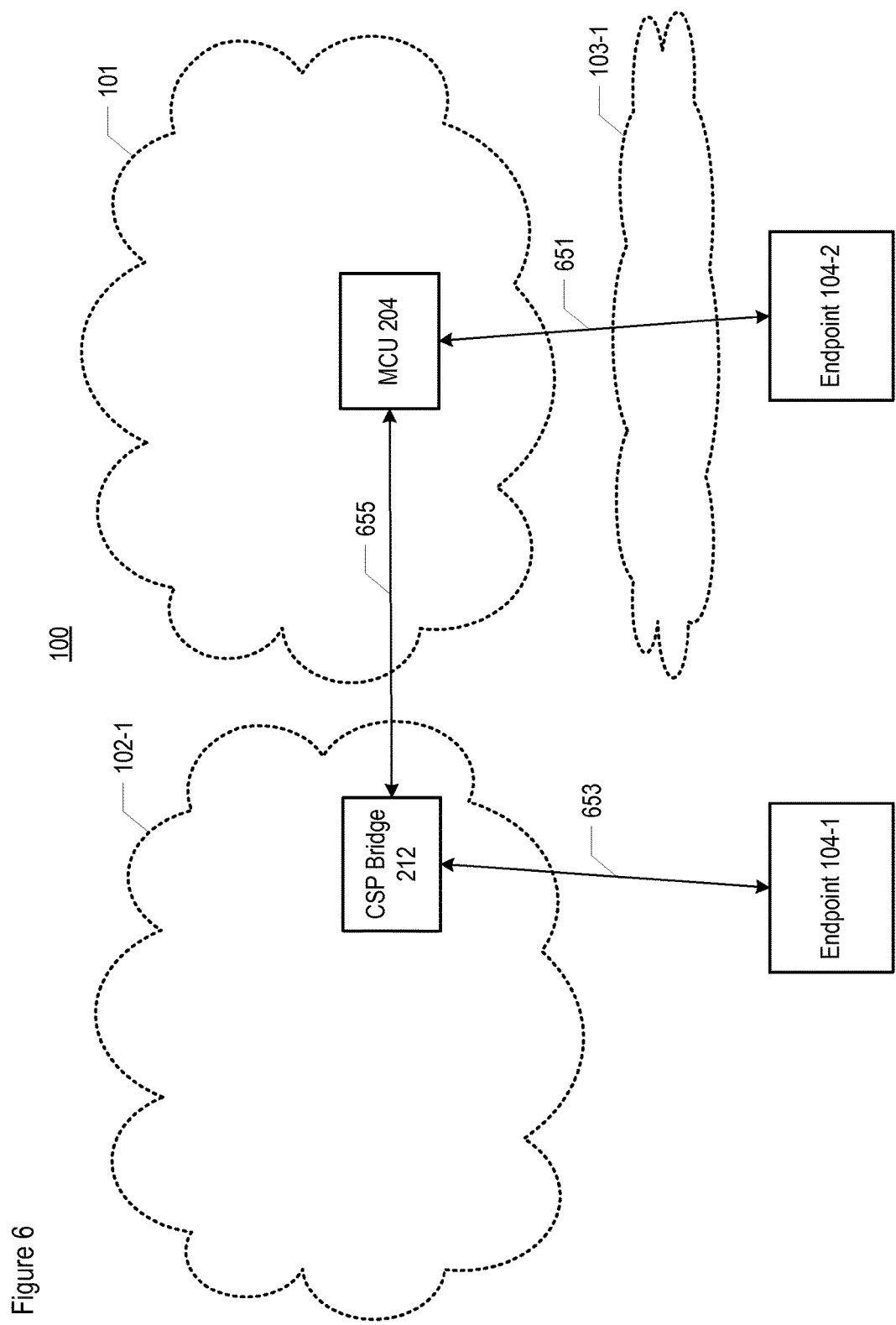
FIG. 6 depicts the connections between endpoints 104-1 and 104-2 that result from at least some of the operations depicted in FIGS. 5A through 5C.

FIG. 6 depicts the connections between endpoints 104-1 and 104-2 that result from at least some of the operations depicted in FIGS. 5A through 5C. Path 651 corresponds to video/UC session 519 that was set up in accordance with the operations depicted in FIG. 5A. Path 653 corresponds to audio session 591 that was set up in accordance with the operations depicted in FIG. 5B. Path 655 corresponds to cascaded audio stream 641 that was set up in accordance with the operations depicted in FIG. 5C. As can be seen in FIG. 6, and in accordance with the illustrative embodiment of the present disclosure, CSP network 102-1 is able to utilize its CSP bridge 212, as well as its other resources, in order to support a teleconference that also involves other endpoints that have sessions established with MCU 204 within UC network 101.

As those who are skilled in the art will appreciate after reading this specification, one or more enterprise-associated endpoints, in addition to endpoint 104-2, can be bridged into MCU 204 using at least some of the operations disclosed herein. As those who are skilled in the art will further appreciate after reading this specification, one or more CSP-associated endpoints, in addition to endpoint 104-1, can be bridged into CSP bridge 212 using at least some of the operations disclosed herein, thereby enabling resources within CSP network 102-1 to be leveraged even further. Furthermore, CSP bridges in additional CSP networks can be bridged into MCU 204, in addition to CSP bridge 212 of CSP network 102-1, using at least some of the operations disclosed herein, thereby enabling resources across multiple CSP networks to be leveraged even further.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A conference management system in a first telecommunications network comprising:
   a transmitter that is configured to transmit a first message to a data-processing system, wherein the first message specifies a subscription to events that involve a predetermined set of entities;
   a receiver that is configured to receive a second message from the data-processing system specifying that a first conference is starting, wherein the first conference involves the predetermined set of entities identified in the first message transmitted to the data-processing system;
   the transmitter being further configured to transmit a third message to a third data processing system in a second telecommunications network upon the receipt of the second message by the receiver, wherein the third message specifies to the third data-processing system to monitor for activities related to the first conference, and wherein the first and second telecommunications networks are managed by different service providers; and
   a processor that is configured to:
   coordinate, based on a fourth message being received from the third data processing system subsequent to the transmitting of the third message and that specifies the first conference, the establishing of a communications link between a first bridging device in the first telecommunications network and a second bridging device in the second telecommunications network, wherein the first and second bridging devices are being used by the first conference, and
   determine a second conference identification (ID) in response to the receiving of the second message, wherein the first conference is identified by a first conference ID in the second message, and wherein the second conference ID serves to identify the first conference to the third data-processing system.

2. The conference management system of claim 1, wherein the receiver is further configured to receive a fifth message from the data-processing system, wherein the fifth message specifies that the first conference is ending;
   wherein the processor is further configured to coordinate the dropping of the communications link between the first bridging device and the second bridging device, in response to the receiving of the fifth message; and
   wherein the transmitter is further configured to transmit:
   (i) a sixth message to a session manager, wherein the sixth message specifies that the communications link is to be dropped for the first conference, and
   (ii) a seventh message to the third data-processing system, wherein the seventh message specifies to stop monitoring for activities related to the first conference.

3. The conference management system of claim 1 wherein the receiver is further configured to receive a fifth message from the third data-processing system, wherein the fifth message specifies that a participant endpoint has dropped from the first conference;
   wherein the processor is further configured to coordinate the dropping of the communications link between the first bridging device and the second bridging device, in response to the participant endpoint being the last endpoint to have been using the second bridging device for the first conference; and
   wherein the transmitter is further configured to transmit a sixth message to a session manager, specifying the first conference.

4. A first telecommunications network comprising:
   a conference management system that is configured to:
   (i) transmit, to a data-processing system, a first message that specifies a subscription to events that involve a predetermined set of entities,
   (ii) receive a second message from the data-processing system specifying that a first conference is starting, wherein the first conference involves the set of entities identified in the first message,
   (iii) transmit, upon receiving the second message, a third message to a third data processing system in a second telecommunications network, wherein the third message specifies to the third data-processing system to monitor for activities related to the first conference, and wherein the first and second telecommunications networks are managed by different service providers, and
   (iv) establish, upon receiving a fourth message from the third data-processing system wherein the fourth message specifies the first conference, a communications link between a first bridging device in the first telecommunications network and a second bridging device in the second telecommunications network, wherein the
   first and second bridging devices are being used by the first conference, and wherein the receiving of the fourth message is subsequent to the transmitting of the third message;
   (v) determine a second conference identification (ID) in response to the receiving of the second message, wherein the first conference is identified by a first conference ID in the second message, and wherein the second conference ID serves to identify the first conference to the third data-processing system; and
   a network management platform that is configured to:
   (i) receive the first message from the conference management system,
   (ii) receive, from the first bridging device, an indication that a communication session with a first endpoint has started, and
   (iii) transmit the second message to the conference management system, in response to the receiving of (a) the first message and (b) the indication that the communication session has started.

5. The first telecommunications network of claim 4, further comprising a multipoint control unit, wherein the multipoint control unit is configured to provide the functionality of the first bridging device.

6. The first telecommunications network of claim 4, further comprising a session manager that is configured to add the communications link in response to receiving, from the conference management system, a message that specifies the first conference.

7. A method comprising:
transmitting, by a conference management system in a first telecommunications network to a data-processing system, a first message that specifies a subscription to events that involve a predetermined set of entities;
receiving, by the conference management system, a second message from the data processing system specifying that a first conference is starting, wherein the first conference involves the set of entities identified in the first message;
upon receiving the second message, transmitting by the conference management system a third message to a third data-processing system in a second telecommunications network, wherein the third message specifies to the third data-processing system to monitor for activities related to the first conference, and wherein the first and second telecommunications networks are managed by different service providers;
upon receiving a fourth message from the third data-processing system wherein the fourth message specifies the first conference, establishing by the conference management system a communications link between a first bridging device in the first telecommunications network and a second bridging device in the second telecommunications network, wherein the first and second bridging devices are being used by the first conference, and wherein the receiving of the fourth message is subsequent to the transmitting of the third message; and
determining a second conference identification (ID) in response to the receiving of the second message, wherein the first conference is identified by a first conference ID in the second message, and wherein the second conference ID serves to identify the first conference to the third data-processing system.

8. The method of claim 7, wherein the set of entities comprises an enterprise and a communications service provider, wherein the communications service provider manages the second telecommunications network.

9. The method of claim 7 further comprising:
receiving, by the data-processing system, the first message from the conference management system;
receiving, by the data-processing system from the first bridging device, an indication that a communication session with a first endpoint has started; and
transmitting, by the data-processing system, the second message to the conference management system, in response to the receiving of (i) the first message and (ii) the indication that the communication session has started.

10. The method of claim 7 wherein the establishing of the communications link comprises transmitting, by the conference management system, a fifth message to a session manager, wherein the fifth message specifies the first conference.

11. The method of claim 7 further comprising:
upon receiving the second message, transmitting by the conference management system a fifth message to a fourth data-processing system in a third telecommunications network, wherein the fifth message specifies to the fourth data-processing system to monitor for activities related to the first conference, and wherein the first and third telecommunications networks are managed by different service providers; and
upon receiving a sixth message from the fourth data-processing system wherein the sixth message specifies the first conference, establishing by the conference management system a communications link between the first bridging device and a third bridging device in the third telecommunications network, wherein the third bridging device is also being used by the first conference, and wherein the receiving of the sixth message is subsequent to the transmitting of the fifth message.

12. The method of claim 11 wherein the first, second, and third telecommunications networks are managed by different service providers.

13. The method of claim 7 further comprising:
receiving, by the conference management system, a fifth message from the second data-processing system, wherein the fifth message specifies that the first conference is ending; and
dropping by the conference management system, the communications link between the first bridging device and the second bridging device, in response to the receiving of the fifth message.

14. The method of claim 13 wherein the dropping of the communications link comprises:
transmitting, by the conference management system, a sixth message to a session manager, specifying the first conference; and
transmitting, by the conference management system, a seventh message to the third data-processing system, specifying to stop monitoring for activities related to the first conference.

15. The method of claim 7 further comprising:
receiving, by the conference management system, a fifth message from the third data-processing system, wherein the fifth message specifies that a participant endpoint has dropped from the first conference; and
dropping, by the conference management system, the communications link between the first bridging device and the second bridging device, in response to the participant endpoint being the last endpoint to have been using the second bridging device for the first conference.

16. The method of claim 15 wherein the dropping of the communications link comprises transmitting, by the conference management system, a sixth message to a session manager, specifying the first conference.

17. The method of claim 15 further comprising waiting for a predetermined time interval before the dropping of the communications link.

18. The conference management system of claim 1 wherein the transmitter is further configured to transmit a fifth message to a session manager, wherein the fifth message specifies that the communications link is to be established for the first conference.

* * * * *